United States Patent [19]

Takano et al.

[11] Patent Number: 4,913,913

[45] Date of Patent: Apr. 3, 1990

[54] METHOD OF PREPARATION OF BIFIDOBACTERIA-CONTAINING FERMENTED MILK

[75] Inventors: Toshiaki Takano, Kanagawa; Yoshio Saito, Tokyo; Akira Futami, Kanagawa, all of Japan

[73] Assignee: The Calpis Food Industry Co., Ltd., Tokyo, Japan

[21] Appl. No.: 163,478

[22] Filed: Feb. 23, 1988

[30] Foreign Application Priority Data

Feb. 25, 1987 [JP] Japan ................... 62-040098

[51] Int. Cl.$^4$ .............................................. A23C 9/127
[52] U.S. Cl. ........................................ 126/43; 426/42; 426/61
[58] Field of Search ................ 426/34, 42, 43, 61, 426/580, 583

[56] References Cited

U.S. PATENT DOCUMENTS 4,187,321 2/1980 Mutaio et al. .
4,298,619 11/1981 Mutai et al. ............................ 426/43
4,588,595 5/1986 Okonogi et al. ...................... 426/43

FOREIGN PATENT DOCUMENTS 6152253 3/1983 Japan .
58-111638 7/1983 Japan .
0154614 11/1985 Sweden .

OTHER PUBLICATIONS

Chem. Abstract, vol. 101, No. 15, Oct. 8, 1984, p. 373, no. 126545d, Cheng et al., "Effect of Peptides and Amino Acids Produced by *Lactobacillus Casei*-in Milk on the Acid Production of Bifidobacteria . . . ".
Jpn. J. Zootec Sci., 54(11): 740-747 (1983).
Kagaku-to-Seibutsu, vol. 21, No. 1, pp. 8-9.
Japanese Journal of Dairy and Food Science, vol. 33, No. 6, 1984, A203-A212.

*Primary Examiner*—Marianne Cintins
*Attorney, Agent, or Firm*—Browdy and Neimark

[57] ABSTRACT

Lactic acid bacteria *Lactobacillus casei* C-2254 (FERM P-9109; FERM BP-1723) and *Bifidobacterium longum* are cultivated in mixture or are mixed after being separately cultivated, and thus a bifidobacteria-containing lactic acid bacteria-fermented milk with an elevated survival rate of *Bifidobacterium longum* is obtained.

12 Claims, No Drawings

METHOD OF PREPARATION OF BIFIDOBACTERIA-CONTAINING FERMENTED MILK

FIELD OF THE INVENTION

The present invention relates to a method of preparation of bifidobacteria-containing fermented milk in which the survival rate of *Bifidobacterium longum* has been elevated.

In general, bifidobacteria have a significant relation to health for all of sucklings, infants and adults, and recently, it has even been said that the absence of bifidus bacteria in intestines is abnormal.

Strains of *Lactobacillus casing* for use in the present invention have a function of extremely elevating the survival rate of *Bifidobacterium longum*, as compared with common lactic acid bacteria, and the *Bifidobacterium longum* can well survive in the fermented milk products of the present invention during cold storage. Accordingly, as it is expected that a noticeable amount of living bacteria of *Bifidobacterium longum* could reach the intestines, when the milk products are actually drunk or eaten, the products are considered to have significantly advantageous merits in the fields of health food industries and milk product industries.

BACKGROUND OF THE INVENTION

Hitherto, there are numerous medicines and foods prepared by utilizing bifidobacteria, and in particular, many milk products such as yogurt, fermented milk, powdered yogurt, etc. are bifidobacteria-containing products.

For the preparation of such bifidobacteria-containing products, a method of adding a concentrated powder of bifidobacteria to a yogurt is often utilized. As the kind of the strains of the bacteria for use in the said method, there are recommended *Bifidobacterium breve* for products for sucklings and *Bifidobacterium longum* for products for infants and adults (*Kagaku-to-Seibutsu*, Vol. 21, No. 1. pages 8-9).

Further, it has also been tried to elevate the survival rate of bifidus bacteria by incubation of bifidus bacteria (*Bifidobacterium longum*) together with lactic acid bacteria (*Streptococcus thermophilus*) (*Japanese Journal of Dairy and Food Science*, Vol. 33, No. 6, 1984, A20-3-A212).

The present inventors cultivated known *Lactobacillus casei*, which is good in taste as lactic acid bacteria in mixture with *Bifidobacterium longum*, which is recommended for infants and adults, or alternatively blended the separately cultivated bacteria, so as to obtain various bifidobacteria-containing fermented milks, and then stored the thus-prepared milks for 7 days at 10° C. to examine the survival rate of the bifidus bacteria in the respective milks. As a result, it was found that the survival rate of *Bifidobacterium longum* was only from 0.33 to 0.87% or so in all the examined samples.

In view of the fact that the general cold distribution period may be one week or so, such low survival rate of from 0.33 to 0.87% mean that the bifidobacteria could hardly reach the intestines when the bacteria-containing products are actually drunk or eaten.

SUMMARY OF THE INVENTION

Having a conception that any other strains of *Lactobacillus casei* as derived from various sources than hitherto known strains of *Lactobacillus casei* may have a function of elevating the survival rate of *Bifidobacterium longum*, the present inventors earnestly carried out the selection and isolation of the intended strains, and as a result, have found that four strains of *Lactobacillus casei* as newly isolated by the present invention are effective for elevating the survival rate of *Bifidobacterium longum*.

The strains as newly isolated by the present invention include the following, which were deposited in Fermentation Research Institute, Agency of Industrial Science and Technology, Japan with the respective numbers parenthesized.

*Lactobacillus casei* C-2203 (FERM P-9106),
*Lactobacillus casei* C-2204 (FERM P-9107),
*Lactobacillus casei* C-2205 (FERM P-9108) and
*Lactobacillus casei* C-2254 (FERM P-9109; FERM BP-1723)

These may be referred to as C-2203, C-2204, C-2205 and C-2254, respectively, hereinafter.

Lactic acid bacteria of one or more strains selected from the group consisting of the said strains are cultivated in mixture with *Bifidobacterium longum*, or alternatively, the separately cultivated bacteria or the processed materials obtained therefrom are blended, whereby the survival rate of the said bacteria of *Bifidobacterium longum* can be elevated up to about from 8.4 to 17.7% or so under storage at 10° C. for 7 days.

DETAILED DESCRIPTION OF THE INVENTION

Bacteriological properties of C-2203, C-2204, C-2205 and C-2254 are mentioned below, which are recognized to correspond to the properties of *Lactobacillus casei*. Regarding the surface appearance of BL agar medium, after grown thereon, C-2203, C-2204 and C-2254 showed a rough form, while C-2205 showed an intermediate state of a rough form and a smooth form.

Bacteriological Properties of Four Strains of C-2203, C-2204, C-2205 and C-2254:

Gram Staining: Positive.
Catalase: Negative.
Gas Production: Negative,
Growth at 15° C.: Positive,
Growth at 45° C.: Positive,
Optical Activity of Lactic Acid: L(+),
Assimilation of Carbohydrates:
 (+): Rhamnose, Glucose, Mannose, Fructose, Galactose, Sucrose, Maltose, Cellobiose, Lactose, Trehalose, Melezitose, Ribose, Mannitol, Sorbitol, Amygdalin, Esculin, Salicin.
 (−): Arabinose, Xylose, Melibiose, Raffinose, Starch.
Cell morphology when cultivated on BL agar at 37° C. for 48 to 72 hours:
 Size: 0.5 to 1.1 μm.
 Form: Usually bacilli, but often coccobacilli.
Characteristics of colonies when cultivated on BL agar (by Nissui Pharmaceutical Co., Japan) at 37° C. for 48 to 72 hours:
 Form: Circle.
 Projection: Cone.
 Circumferential edge: Smooth.
 Size: 0.5 to 2 mm
 Color Dark brown in the center, while light brown to gray in the circumferential edge.
 Surface: Rough form (C-2204, C-2254), Intermediate of rough form and smooth form (C-2205).

One or more strains among the above-mentioned four strains of *Lactobacillus casei* are inoculated in a milk medium and incubated at 37° C. for 16 hours or so to prepare a starter.

As the *Bifidobacterium longum* for the present invention, any one of known strains or newly isolated strains can be used. For example, there may be mentioned *Bifidobacterium longum* ATCC 15707, *Bifidobacterium longum* CZ-1907, etc.

The strain of *Bifidobacterium longum* is incubated in a medium where the said strain can grow, for example, a reconstituted skim milk medium to which an yeast extract was added, at 37° C. for 18 hours or so to prepare a starter.

According to the present invention, the starter of the above-mentioned lactic acid bacteria and the starter of *Bifidobacterium longum* are cultivated in mixture or separately.

When these are cultivated in mixture, the former starter is added to a milk medium in a proportion of 5 to 1% and the latter starter 10 to 1%, and cultivated therein at 37° C. for 15 hours, to obtain a bifidobacteria-containing fermented milk.

When these are cultivated separately, the starter of the lactic acid bacteria is added to a milk medium in a proportion of from 5 to 1% and cultivated therein at 37° C. for 18 hours to obtain a lactic acid bacteria-fermented milk.

On the other hand, the starter of *Bifidobacterium longum* is added to the other milk medium in a proportion of from 10 to 1% and cultivated therein at 37° C. for 18 hours to obtain a cultivated material of *Bifidobacterium longum*.

Next, a cultivated material (the lactic acid bacteria-fermented milk or the cells separated therefrom) prepared by the use of at least one strain of the four strains of *Lactobacillus casei* and a cultivated material of *Bifidobacterium longum* or a processed material thereof are blended. Alternatively, a processed material of the above-mentioned lactic acid cultivated material and a cultivated material of *Bifidobacterium longum* or a processed material thereof are blended. The cultivated material may be the cultivated liquid medium itself of the bacteria or the cells separated from the cultivated liquid medium, and the processed material includes a concentrated material, a spray-dried material, a frozen material or a vacuum freeze-dried material, or the like to be obtained from the cultivated material.

These may be blended in any state, but it is preferred that the number of the living bacteria of *Bifidobacterium longum* be adjusted to be from $10^8$ to $10^9$/ml or so in the lactic acid bacteria-fermented milk.

In the practice of the present invention, any other lactic acid bacteria may optionally added to the fermented milk, if desired.

As the milk medium for the present invention, any conventional milk material medium which is generally used for preparation of fermented milk may be employed, e.g., including cow's milk, a skim milk, a reconstituted skim milk, etc.

In accordance with the present invention as herein illustrated in detail, the strains of C-2203, C-2204, C-2205 and C-2254 are effective for extremely elevating the survival ratio of *Bifidobacterium longum* in a bifidobacteria-containing fermented milk during storage.

The following examples are intended to illustrate the present invention but not to limit it in any way.

EXPERIMENTAL EXAMPLE 1

Test of Survival Rate of *Bifiidobacterium longum* by Blend Cultivation

Method:

A 10% reconstituted skim milk medium was autoclaved at 121° C. for 15 minutes, and then 1% of a starter of the strain of *Lactobacillus casei* (shown in Table 1 below) which had previously been grown in the same medium and 10% of a starter of the strain of *Bifidobacterium longum* (shown in Table 1 below) which had been grown in a 15% reconstituted skim milk medium (containing 0.4% of yeast extract and autoclaved at 121° C. for 15 minutes) were inoculated in the said medium in mixture and cultivated for 15 hours at 37° C. This was stirred and kept at 10° C.

Measurement

Immediately after the preparation and after storage for 7 days at 10° C., the cultivated material was sampled, and the pH value and the number of the living bacteria in the respective samples were measured (by a modified Mitsuoka Method). (Almost no difference was admitted in the number of *L. casei* between immediately after the preparation and after storage for 7 days.)

Strains Tested:
*Lactobacillus casei* ATCC 7469
*Lactobacillus casei* ATCC 393
*Lactobacillus casei* C-2203
*Lactobacillus casei* C-2204
*Lactobacillus casei* C-2205
*Lactobacillus casei* C-2254
*Bifidobacterium longum* ATCC 15707
*Bifidobacterium longum* CZ-1907
Results:
The results obtained are shown in Table 1 below.

TABLE 1

| | | Immediately after Preparation | | | Stored for 7 days at 10° C. | | |
|---|---|---|---|---|---|---|---|
| L. casei | B. longum | pH | Number of L. casei | Number of B. longum | pH | Number of B. longum | Survival Rate |
| ATCC 7469 | ATCC 15707 | 4.49 | $7.8 \times 10^8$ | $7.0 \times 10^8$ | 4.40 | $3.6 \times 10^6$ | 0.51 |
| ATCC 7469 | CZ-1907 | 4.47 | $7.5 \times 10^8$ | $9.5 \times 10^8$ | 4.37 | $7.2 \times 10^6$ | 0.76 |
| ATCC 393 | ATCC 15707 | 4.46 | $8.5 \times 10^8$ | $8.0 \times 10^8$ | 4.35 | $7.0 \times 10^6$ | 0.87 |
| ATCC 393 | CZ-1907 | 4.48 | $8.0 \times 10^8$ | $5.8 \times 10^8$ | 4.39 | $2.6 \times 10^6$ | 0.45 |
| C-2203 | CZ-1907 | 4.50 | $6.1 \times 10^8$ | $9.5 \times 10^8$ | 4.39 | $1.0 \times 10^8$ | 10.5 |
| C-2204 | CA-1907 | 4.47 | $5.1 \times 10^8$ | $8.2 \times 10^8$ | 4.35 | $8.5 \times 10^7$ | 10.4 |
| C-2205 | CZ-1907 | 4.42 | $7.2 \times 10^8$ | $8.5 \times 10^8$ | 4.33 | $1.0 \times 10^8$ | 11.8 |
| C-2254 | CZ-1907 | 4.40 | $5.9 \times 10^8$ | $2.6 \times 10^9$ | 4.30 | $4.6 \times 10^8$ | 17.7 |
| —* | ATCC-15707 | 4.35 | — | $3.4 \times 10^8$ | 4.35 | $7.0 \times 10^4$ | 0.02 |
| —* | CZ-1907 | 4.27 | — | $2.5 \times 10^8$ | 4.26 | $5.0 \times 10^4$ | 0.02 |

*10% reconstituted skim milk was adjusted to have pH 4.35 with lactic acid.

EXPERIMENTAL EXAMPLE 2

Test of Survival Rate of *Bifidobacterium longum* by Strain of *Lactobacillus casei*

Method:

A 10% reconstituted skim milk medium was autoclaved at 121° C. for 15 minutes, and then 3% of a starter of the strain of *Lactobacillus casei* (shown in Table 2 below) which had previously been grown in the same medium was added thereto and cultivated for 15 hours at 37° C.

On the other hand, 0.4% of yeast extract was added to a 15% reconstituted skim milk and autoclaved at 121° C. for 15 min., and then 10% of a starter of the strain of *Bifidobacterium longum* (shown in Table 2 below) which had previously been grown in the same medium was added thereto and cultivated for 15 hours at 37° C. 10 parts of the thus cultivated material were added to 90 parts of the lactic acid bacteria-fermented milk described above, and then well blended and stored at 10° C.

Measurement:

Immediately after the preparation and after storage for 7 days at 10° C., the cultivated material was sampled and the pH value and the number of the living bacteria in the respective samples were measured (by a modified Mitsuoka Method). (Almost no difference was admitted in the number of *L. casei* between immediately after the preparation and after storage for 7 days.)

Strains Tested:
*Lactobacillus casei* ATCC 7469
*Lactobacillus casei* ATCC 393
*Lactobacillus casei* C-2203
*Lactobacillus casei* C-2204
*Lactobacillus casei* C-2205
*Lactobacillus casei* C-2254
*Bifidobacterium longum* ATCC 15707
*Bifidobacterium longum* CZ-1907

Results:

The results obtained are shown in Table 2 below.

TABLE 2

| L. casei | B. longum | Immediately after Preparation | | | Stored for 7 days at 10° C. | | |
|---|---|---|---|---|---|---|---|
| | | pH | Number of L. casei | Number of B. longum | pH | Number of B. longum | Survival Rate |
| ATCC 7469 | ATCC 15707 | 4.37 | $9.8 \times 10^8$ | $5.7 \times 10^8$ | 4.29 | $4.2 \times 10^6$ | 0.74 |
| ATCC 7469 | CZ-1907 | 4.35 | $1.2 \times 10^9$ | $6.3 \times 10^8$ | 4.25 | $5.5 \times 10^6$ | 0.87 |
| ATCC 393 | ATCC 15707 | 4.38 | $1.9 \times 10^9$ | $3.5 \times 10^8$ | 4.30 | $2.0 \times 10^6$ | 0.57 |
| ATCC 393 | CZ-1907 | 4.32 | $1.1 \times 10^9$ | $2.6 \times 10^8$ | 4.25 | $8.5 \times 10^6$ | 0.33 |
| C-2203 | CZ-1907 | 4.45 | $8.7 \times 10^8$ | $4.3 \times 10^8$ | 4.27 | $3.6 \times 10^7$ | 8.4 |
| C-2204 | CZ-1907 | 4.42 | $1.1 \times 10^9$ | $3.6 \times 10^8$ | 4.23 | $3.2 \times 10^7$ | 8.9 |
| C-2205 | CZ-1907 | 4.45 | $1.2 \times 10^9$ | $5.0 \times 10^8$ | 4.25 | $5.2 \times 10^7$ | 10.4 |
| C-2254 | CZ-1907 | 4.42 | $1.2 \times 10^9$ | $2.8 \times 10^8$ | 4.19 | $4.4 \times 10^7$ | 15.7 |
| —* | ATCC-15707 | 4.35 | — | $3.4 \times 10^8$ | 4.35 | $7.0 \times 10^4$ | 0.02 |
| —* | CZ-1907 | 4.27 | — | $2.5 \times 10^8$ | 4.26 | $5.0 \times 10^4$ | 0.02 |

*10% reconstituted skim milk was adjusted to have pH 4.35 with lactic acid.

EXAMPLE 1

A 10% reconstituted skim milk was pasteurized by heating at 95° C. for 30 minutes to prepare a milk medium, and 1% of a starter of *Lactobacillus casei* C-2203 as cultivated in the same medium was inoculated in the said milk medium and cultivated for 18 hours at 37° C.

On the other hand, 0.4% of yeast extract was added to a 15% reconstituted skim milk and pasteurized under heating at 95° C. for 30 minutes to prepare a milk medium, and 10% of a starter of *Bifidobacterium longum* ATCC 15707 as cultivated in the same medium was inoculated in the milk medium and cultivated for 18 hours at 37° C.

10 kg of the bifidobacteria-fermented milk and 70 kg of the lactic acid bacteria-fermented milk previously described were blended and 20 kg of a sterilized water was added thereto, and the resulting mixture was homogenized with a homogenizer to obtain 100 kg of a fermented milk product with a non-fat milk solid content of 8%.

The product had a mild and favorable taste. Immediately after the preparation, this had a pH value of 4.1 and contained $2.6 \times 10^8$ cells/ml of *B. longum* and $7.8 \times 10^8$ cells/ml of *L. casei*. After storage for 7 days at 10° C., the number of the living *B. longum* was $1.0 \times 10^7$ cells/ml.

EXAMPLE 2

A 10% reconstituted skim milk was pasteurized under heating at 95° C. for 30 minutes to prepare a milk medium, and a starter of *Lactobacillus casei* C-2204 and a starter of *Lactobacillus casei* C-2254, which had been cultivated separately in the same medium, were inoculated in the said milk medium each in an amount of 0.5% and cultivated for 18 hours at 37° C.

On the other hand, 0.4% of yeast extract was added to a 15% reconstituted skim milk and pasteurized under heating at 95° C. for 30 minutes to prepare a milk medium, and 10% of a starter of *Bifidobacterium longum* CZ-1970 as cultivated in the same medium was inoculated in the said milk medium and cultivated for 18 hours at 37° C.

10 kg of the bifidobacteria-fermented milk and 70 kg of the lactic acid bacteria-fermented milk previously described were blended and 20 kg of sterilized water was added thereto, and the resulting mixture was homogenized with a homogenizer to obtain 100 kg of a fermented milk product with a non-fat milk solid content of 8%.

The product had a mild and favorable taste. Immediately after the preparation, this had a pH value of 4.2 and contained $2.7 \times 10^8$ cells/ml of *B. longum* and $7.8 \times 10^8$ cells/ml of *L. casei*. After storage for 7 days at 10° C. the number of the living *B. longum* was $1.2 \times 10^7$ cells/ml.

EXAMPLE 3

A 10% reconstituted skim milk was pasteurized under heating at 95° C. for 30 minutes to prepare a milk medium, and 1% of a starter of *Lactobacillus casei* C-2203 as cultivated in the same medium and 10% of a starter of *Bifidobacterium longum* ATCC 15707 as cultivated in a milk medium (prepared by adding 0.4% of yeast extract to a 15% reconstituted skim milk and pasteurized by heating at 95° C. for 30 minutes) were inoculated therein in mixture and cultivated for 15 hours at 37° C.

A syrup prepared by dissolving 8 kg of sugar in 7 kg of water followed by pasteurization of the resulting solution at 100° C. for 5 minutes and cooling was blended with 85 kg of the fermented milk containing *Lactobacillus casei* and bifidobacteria and homogenized to obtain 100 kg of a fermented milk product with a non-fat milk solid content of 8%.

The product had a mild and favorable taste. Immediately after the preparation, this had a pH of 4.4 and contained $2.2 \times 10^9$ cells/ml of *B. longum* and $50 \times 10^8$ cells/ml of *L. casei*. After storage for 7 days at 10° C., the number of the living *B. Longum* was $3.9 \times 10^8$ cells/ml.

EXAMPLE 4

A 10% reconstituted skim milk was pasteurized by heating at 95° C. for 30 minutes to prepare a milk medium, and 1% of a starter of *Lactobacillus casei* C-2254 as cultivated in the same medium was inoculated in the said milk medium and cultivated for 18 hours at 37° C.

On the other hand, a liquid medium containing 5% of protease-treated whey powder, 0.4 of yeast extract and 1% of calcium carbonate was pasteurized by heating at 95° C. for 60 minutes, and after 0.2% of ascorbic acid was added thereto, 5% of a starter of *Bifidobacterium longum* CZ-1907 as cultivated in the same medium was inoculated and cultivated for 18 hours at 37° C. The cultivated cells were harvested by using a Scharples-type centrifuge, washed and suspended in a 15% reconstituted skim milk, pasteurized(95° C., 30 min), to which 1% sodium glutamate had been added. The obtained cell suspension was lyophilized under the conditions of freezing temperature at $-30°$ C., drying shelf temperature at 25° C. and degree of vacuum at 0.01 Torr to obtain a bifidobacteria powder 1 kg of bifidobacteria powder and 85 kg of the lactic acid bacteria-fermented milk previously described were blended and 14 kg of sterilized water was added thereto, and the resulting mixture was homogenized with a homogenizer to obtain 100 kg of a fermented milk product with a non-fat milk solid content of 8%.

The product had a mild and favorable taste. Immediately after the preparation, this had a pH value of 4.4 and container $3.1 \times 10^8$ cells/ml of *B. longum* and $5.2 \times 10^8$ cells/ml *L. casei*. After stored for 7 days at 10° C., the number of the living *B. longum* was $2.7 \times 10^7$ cells/ml.

EXAMPLE 5

0.4% of yeast extract was added to a 15% reconstituted skim milk and pasteurized under heating at 95° C. for 30 minutes to prepare a milk medium, and 10% of a starter of *Bifidobacterium longum* CZ-1907 as cultivated in the same medium was inoculated in the said milk medium and cultivated for 18 hours at 37° C.

On the other hand, a liquid medium containing 5% of protease-treated whey powder, 0.4% of yeast extract and 1% of calcium carbonate was pasteurized by heating at 95° C. for 60 minutes, and 1% of a starter of *Lactobacillus casei* C-2205 as cultivated in the same medium was inoculated thereto and cultivated for 18 hours at 37° C. The cultivated cells were harvested by using a Sharples-type centrifuge, washed and suspended in a pasteurized 15% reconstituted skim milk to which 1% sodium glutamate had been added. The obtained cell suspension was lyophilized under the conditions of freezing temperature at $-30°$ C., drying shelf temperature at 25° C. and degree of vacuum at 0.01 Torr to obtain a lactic acid bacteria powder.

1 kg of the lactic acid bacteria powder and 85 kg of the bifidobacteria-fermented milk previously described were blended and 14 kg of sterilized water was added thereto, and the resulting mixture was homogenized with a homogenizer to obtain 100 kg of a fermented milk product with a non-fat milk solid content of 8%.

The product had a mild and favorable taste. Immediately after the preparation, this had a pH value of 4.4 and contained $4.5 \times 10^8$ cells/ml of *B. longum* and $3.9 \times 10^8$ cells/ml of *L. casei*. After storage for 7 days at 10° C., the number of the living *B. Longum* was $5.7 \times 10^7$ cells/ml.

EXAMPLE 6

A liquid medium containing 5% of protease-treated whey powder, 0.4% of yeast extract and 1% of calcium carbonate was pasteurized by heating at 95° C. for 60 minutes, and after 0.2 of ascorbic acid was added thereto, 2% of a starter of *Bifidobacterium longum* CZ-1907 as cultivated in the same medium was inoculated and cultivated for 18 hours at 37° C. The cultivated cells were harvested by using a Sharples-type centrifuge. washed. suspended in a pasteurized 15% reconstituted skim milk. and frozen with dry ice.

On the other hand, a liquid medium containing 5% of protease-treated whey powder, 0.4% of yeast extract and 1% of calcium carbonate was pasteurized by heating at 95° C. for 60 minutes, and 1% of a starter of *Lactobacillus casei* C-2205 as cultivated in the same medium was inoculated thereto, and cultivated for 18 hours at 37° C. The cultivated cells were harvester by using a Sharples-type centrifuge, washed, suspended in a pasteurized 15% reconstituted skim milk and frozen with dry ice.

1 kg of the former frozen material and 1 kg of the later frozen material were blended with 98 kg of milk containing 1% of fat and 8.5% of non-fat milk solid content, and homogenized with a homogenizer to obtain 100 kg of a bifidobacteria-containing milk. This contained $3.7 \times 10^8$ cells/ml of *B. longum* and $4.6 \times 10^8$ cells/ml of *L. casei*. After stored for 7 days at 10° C., the number of the living *B. longum* was $1.1 \times 10^8$ cells/ml.

While the invention has been described in detail and with reference to specific embodiments thereof, it will be apparent to one skilled in the art that various changes and modifications can be made therein without departing from the spirit and scope thereof.

What is claimed is:

1. A method of preparation of a bifidobacteria-containing fermented milk, which consists essentially of
   inoculating into a milk medium
   *Lactobacillus casei* C-2254 (FERM P-9109: BP-1723), and *Bifidobacterium longum*, and cultivating these bacteria under temperature and time conditions sufficient to bring about the resulting fermented milk having $5.2 \times 10^8$-$1.2 \times 10^9$ cells/ml of the *L. casei* and $10^8$-$2.6 \times 10^9$ cells/ml of the *B. longum*.

2. A method of preparation of a bifidobacteria-containing fermented milk, which consists essentially of
   (1) inoculating into a milk medium *Lactobacillus casei* C-2254 (FERM BP-1723) and cultivating the *L. casei*, separately (2) inoculating *Bifidobacterium longum* into a milk medium where the *B. longum* can grow, and cultivating the *B. longum*, and blending the *L. casei*-cultivated medium of (1) with the *B. longum*-cultivated medium of (2) in a ratio sufficient to give $5.2\times10^8$-$1.2\times10^9$ cells/ml of the *L. casei* and $10^8$-$2.6\times10^9$ cells/ml of the *B. longum* in the resulting fermented milk.

3. A method of preparation of a bifidobacteria-containing fermented milk, which consists essentially of
(1) inoculating into a milk medium *Lactobacillus casei* C-2254 (FERM BP-1723) and cultivating the *L. casei*,
separately (2) inoculating *Bifidobacterium longum* into a medium where the *B. longum* can grow, cultivating the *B. longum*, separating the cells from the *B. longum*-cultivated medium, and blending the cells with an edible carrier, and preparing a *B. longum*-containing powder by spray-drying or lyophilization,
and blending the *L. casei*-cultivated medium of (1) with the *B. longum*-containing powder of (2) in a ratio sufficient to give $5.2\times10^8$-$1.2\times10^9$ cells/ml of the *L. casei* and $10^8$-$2.6\times10^9$ cells/ml of the *B. longum* in the resulting fermented milk.

4. A method of preparation of a bifidobacteria-containing fermented milk, which consists essentially of
(1) inoculating *Lactobacillus casei* C-2254 (FERM BP-1723) in a medium where the *L. casei* can grow, cultivating the *L. casei*, separating the cells from the *L. casei*-cultivated medium, blending the cells with an edible carrier, and preparing a *L. casei* containing powder by spray-drying or lyophilization,
separately (2) inoculating *Bifidobacteria longum* into a milk medium where the *B. longum* can grow, and cultivating the *B. longum*,
and blending the *L.casei*-containing powder of (1) with the *B. longum*-cultivated medium of (2) in a ratio sufficient to give $5.2\times10^8$-$1.2\times10^9$ cells/ml of the *L. casei* and $10^8$-$2.6\times10^9$ cells/ml of the *B. longum* in the resulting fermented milk.

5. A method of preparation of a bifidobacteria-containing milk, which consists essentially of
(1) inoculating *Lactobacillus casei* C-2254 (FERM-1723) into a medium where the *L. casei* can grow, cultivating the *L. casei*, separating the cells from the *L. casei*-cultivated medium, suspending the cells in a milk medium, and freezing the suspension,
separately (2) inoculating *Bifidobacteria longum* into a medium where the *B. longum* can grow, cultivating the *B. longum*, separating the cells from the *B. longum*-cultivated medium, suspending the cells in a milk medium, and freezing the suspension,
and blending the suspension of (1), the suspension of (2), and a milk medium in a ratio, sufficient to give $5.2\times10^8$-$1.2\times10^9$ cells/ml of the *L.casei* and $10^8$-$2.6\times10^9$ cells/ml of the *B. longum* in the resulting fermented milk.

6. A method of preparation of a bifidobacteria-containing milk, which consists essentially of
(1) inoculating *Lactobacillus casei* C-2254 (FERM BP-1723) into a medium where the *L. casei* can grow, cultivating the *L. casei*, separating the cells from the *L. casei*-cultivated medium, blending the cells with an edible carrier, and preparing a *L. casei* containing powder by spray-drying or lyophilization,
separately (2) inoculating *Bifidobacterium longum* into a medium where the *B. longum* can grow, cultivating the *B. longum*, separating the cells from the *B. longum*-cultivated medium, blending the cells with an edible carrier, and preparing a *B. longum*-containing powder by spray-drying or lyophilization,
and blending the *L. casei*-containing powder of (1), the *B. longum*-containing powder of (2), and a milk medium in a ratio sufficient to give $5.2\times10^8$-$1.2\times10^9$ cells/ml of the *L. casei* and $10^8$-$2.6\times10^9$ cells/ml of the *B. longum* in the resulting fermented milk.

7. A method of preparation of a bifidobacteria-containing fermented milk according to claim 1, wherein the cultivating is carried out at 37° C. for 15–18 hours to bring about the resulting fermented milk having $5.2\times10^8$-$1.2\times10^9$ cells/ml of the *L. casei* and $2.8\times10^8$-$2.6\times10^9$ cells/ml of the *B. longum*.

8. A method of preparation of a bifidobacteria-containing fermented milk according to claim 2, wherein the *L. casei* is cultivated at 37° C. for 15–18 hours, and the *B. longum* is cultivated at 37° C. for 15–18 hours, and the *L. casei*-cultivated medium of (1) and the *B. longum*-cultivated medium of (2) are blended in a ratio sufficient to give $5.2\times10^8$-$1.2\times10^9$ cells/ml of the *L. casei* and $2.8\times10^8$-$2.6\times10^9$ cells/ml of the *B. longum* in the resulting fermented milk.

9. A method of preparation of a bifidobacteria-containing fermented milk according to claim 3, wherein the *L. casei* is cultivated at 37° C. for 15–18 hours, the *B. longum* is cultivated at 37° C. for 15–18 hours, and the *L. casei*-cultivated medium of (1) and the *B. longum*-containing powder of (2) in a ratio sufficient to give $5.2\times10^8$-$1.2\times10^9$ cells/ml of the *L. casei* and $2.8\times10^8$-$2.6\times10^9$ cells/ml of the *B. longum* in the resulting fermented milk.

10. A method of preparation of a bifidobacteria-containing fermented milk according to claim 4, wherein the *L. casei* is cultivated at 37° C. for 15–18 hours, the *B. longum* is cultivated at 37° C. for 15–18 hours, and the *L. casei*-containing powder of (1) and the *B. longum*-cultivated medium of (2) are blended in a ratio sufficient to give $5.2\times10^8$-$1.2\times10^9$ cells/ml of the *L. casei* and $2.8\times10^8$-$2.6\times10^9$ cells/ml of the *B. longum* in the resulting fermented milk.

11. A method of preparation of a bifidobacteria-containing fermented milk according to claim 5, wherein the *L. casei* is cultivated at 37° C. for 15–18 hours, the *B. longum* is cultivated at 37° C. for 15–18 hours, and the suspension of (1), suspension of (2) and the milk medium are blended in a ratio sufficient to give $5.2\times10^8$-$1.2\times10^9$ cells/ml of the *L. casei* and $2.8\times10^8$-$2.6\times10^9$ cells/ml of the *B. longum* in the resulting fermented milk.

12. A method of preparation of a bifidobacteria-containing fermented milk according to claim 6, wherein the *L. casei* is cultivated at 37° C. for 15–18 hours, the *B. longum* is cultivated at 37° C. for 15–18 hours, and the *L. casei*-containing powder of (1), the *B. longum*-containing powder of (2) and the milk medium are blended in a ratio sufficient to give $5.2\times10^8$-$1.2\times10^9$ cells/ml of the *L. casei* and $2.8\times10^8$-$2.6\times10^9$ cells/ml of the *B. longum* in the resulting fermented milk.

* * * * *